TELEPHONE SYSTEMS

Filed Oct. 18, 1955 10 Sheets-Sheet 1

Inventors
ROBIN DEVENISH ALLUM.
JAMES FREDERICK DENBY.
JAMES GORDON PEARCE.
By
Young, Emery & Thompson
Attorneys Inventors
ROBIN DEVENISH ALLUM
JAMES FREDERICK DENBY
JAMES GORDON PEARCE
By
Young, Emery & Thompson
Attorneys Inventors
ROBIN DEVENISH ALLUM.
JAMES FREDERICK DENBY.
JAMES GORDON PEARCE.
By
Young, Emery & Thompson
Attorneys Inventors
ROBIN DEVENISH ALLUM.
JAMES FREDERICK DENBY
JAMES GORDON PEARCE.
By Young, Emery & Thompson
Attorneys Nov. 11, 1958 R. D. ALLUM ET AL 2,860,190

TELEPHONE SYSTEMS

Filed Oct. 18, 1955 10 Sheets-Sheet 5

Inventors
ROBIN DEVENISH ALLUM.
JAMES FREDERICK DENBY.
JAMES GORDON PEARCE.
By
Young, Emery & Thompson
Attorneys Nov. 11, 1958 R. D. ALLUM ET AL 2,860,190

TELEPHONE SYSTEMS

Filed Oct. 18, 1955 10 Sheets-Sheet 6

Inventors
ROBIN DEVENISH ALLUM.
JAMES FREDERICK DENBY.
JAMES GORDON PEARCE.
By
Young, Emery & Thompson
Attorneys Nov. 11, 1958 R. D. ALLUM ET AL 2,860,190

TELEPHONE SYSTEMS

Filed Oct. 18, 1955 10 Sheets-Sheet 7

Inventors
ROBIN DEVENISH ALLUM.
JAMES FREDERICK DENBY.
JAMES GORDON PEARCE.
By
Young, Emery & Thompson
Attorneys Nov. 11, 1958 R. D. ALLUM ET AL 2,860,190

TELEPHONE SYSTEMS

Filed Oct. 18, 1955 10 Sheets-Sheet 8

Inventors
ROBIN DEVENISH ALLUM.
JAMES FREDERICK DENBY.
JAMES GORDON PEARCE.
By
Young, Emery & Thompson
Attorneys Inventors.
ROBIN DEVENISH ALLUM.
JAMES FREDERICK DENBY.
JAMES GORDON PEARCE.
By Young, Emery & Thompson
Attorneys Nov. 11, 1958 R. D. ALLUM ET AL 2,860,190

TELEPHONE SYSTEMS

Filed Oct. 18, 1955 10 Sheets-Sheet 10

Inventors
ROBIN DEVENISH ALLUM.
JAMES FREDERICK DENBY.
JAMES GORDON PEARCE.
By
Young, Emery & Thompson
Attorneys

1

2,860,190

TELEPHONE SYSTEMS

Robin D. Allum, James F. Denby, and James G. Pearce, Liverpool, England, assignors to Automatic Telephone & Electric Company Limited, Liverpool, England, a British company Application October 18, 1955, Serial No. 541,271

Claims priority, application Great Britain November 27, 1954

10 Claims. (Cl. 179—18)

Figure 1:
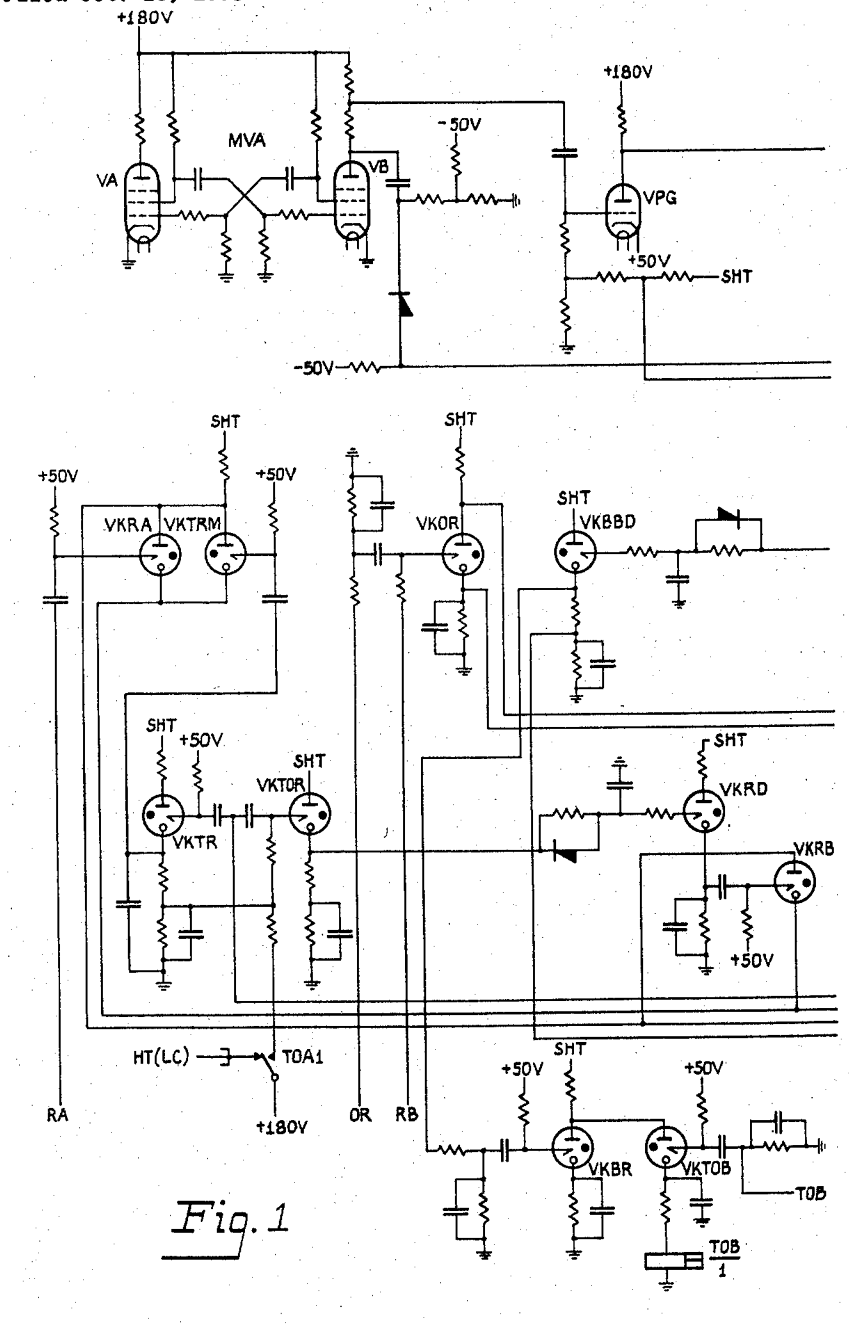

The present invention relates to electrical signalling systems and is more particularly concerned with systems where it is required to singularise one out of a number of circuits.

One particular system in which such singularisation is an important requirement is a telephone system in which it is necessary to singularise one out of a large number of circuits, for instance, calling subscriber's line circuits.

In automatic telephone exchanges of the kind involving a line finder or line finder/final selector stage of the completely electronic or electronically controlled type, means including electronic scanning arrangements have been hitherto suggested for singularising, as regards the whole or a portion of the exchange, any line circuit which has originated a call to enable the setting-up, or the initiation of the setting-up, of a connection from that line circuit.

The main object of the present invention is to provide improvement means for the singularisation of one out of a large number of circuits.

Another object of the invention as applied to a telephone system is to provide singularising means which give a simple and readily interpretable indication of the identity of the singularised subscriber's line circuit in accordance with its directory number.

A further object of the invention is to provide arrangements which enable subscriber's line circuits to be arbitrarily strapped to positions on a switching arrangement without interfering with the singularising means.

According to a feature of the invention, in a telephone system means for singularising a calling subscriber's line circuit from a number of line circuits of which more than one may be in a calling condition at the same time consist in the arranging of the subscriber's line circuits in a plurality of groups of the same size and the provision of scanning equipment adapted to scan a corresponding line circuit in each group simultaneously and the provision of further equipment responsive to the scanning equipment encountering one or more line circuits in a calling condition and operative to singularise the particular calling line circuit or one of the calling line circuits.

Said further equipment may consist of any arrangement which enables one calling line circuit to be singularised to the exclusion of all other calling line circuits. One such arrangement is that known generally as a hunting circuit but other arrangements of which a lock-out circuit is one, may be used.

According to another feature of the invention, in equipment for scanning a plurality of circuits in an electrical signalling system, the circuits are divided into a plurality of equal groups, each group arranged on a two-coordinate basis and the scanning equipment is arranged to scan simultaneously corresponding circuits in all said groups by the application of a first potential to the circuits in corresponding columns (or rows) of all the coordinate arrangements and by the application of a second potential to the circuits in corresponding rows (or columns) of all the co-ordinate arrangements.

2

According to yet another feature of the invention, in equipment for scanning a plurality of subscriber's line circuits and for terminating the scanning operation when a line circuit is encountered in a calling condition the line circuits are divided into a plurality of 100-line groups in accordance with the directory numbers of the lines connected thereto and the scanning equipment is arranged to scan simultaneously line circuits associated with lines having the same tens and units digits in all the groups, the scanning operation being terminated when a line circuit is encountered in a calling condition, the position of the scanning means on the termination of the scanning operation being indicative of the tens and units digits of the calling line circuit while a signal is transmitted from said calling line circuit to equipment which is indicative of the thousands and hundreds digits of the calling line circuit, thereby enabling the group to line circuits which include the calling line circuit to be identified and a gas discharge device in said calling line circuit to be struck to initiate the setting up of a connection therefrom.

According to a still further feature of the invention, in equipment for scanning a plurality of subscriber's line circuits and for terminating the scanning operation when a line circuit is encountered in a calling condition the line circuits are divided into a plurality of 100-line groups in accordance with the directory numbers of the lines connected thereto and the scanning circuits are arranged to scan simultaneously line circuits associated with lines having the same tens and units digits in all the groups the presence of one calling line circuit in a particular group or a plurality of calling line circuits having the same tens and units digits in different groups serving to mark a corresponding position in a hunting circuit which operates to select said particular group or the first of said different groups to enable a connection to be set up from the calling line circuit in the particular group or in the selected group.

According to another feature of the invention, in a telephone system employing switching arrangements controlled to set up connections thereover by equipment provided in common thereto subscriber's line circuits are terminated on the switching arrangements on an arbitrary basis and equipment is provided for singularising calling line circuits on a different basis while leads extend from the line circuits to an arrangement which when a calling line circuit has been singularised provides indications to the common equipment which enable such equipment to control the operation of the switching arrangements to set up a connection thereover from the point of termination of the calling line circuit.

Figure 2:
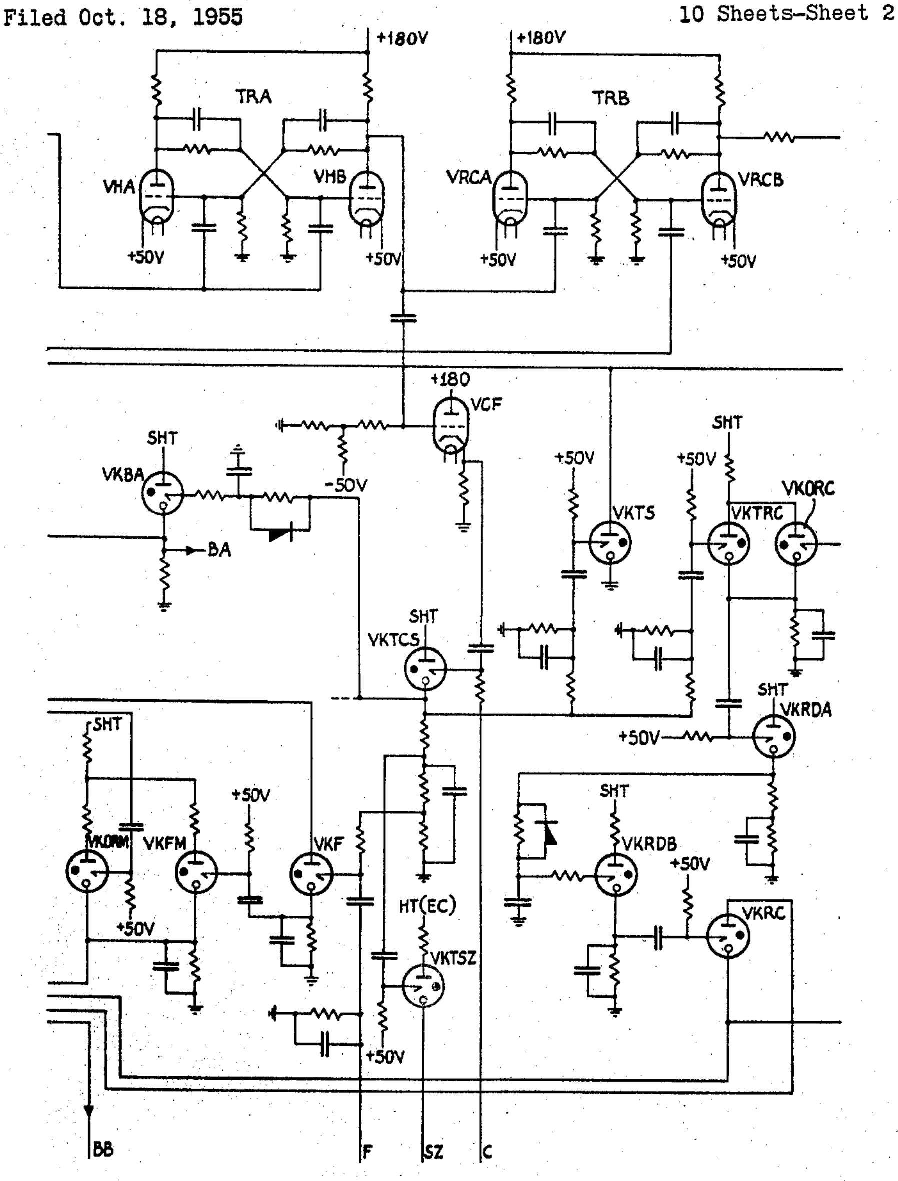
Figure 3:
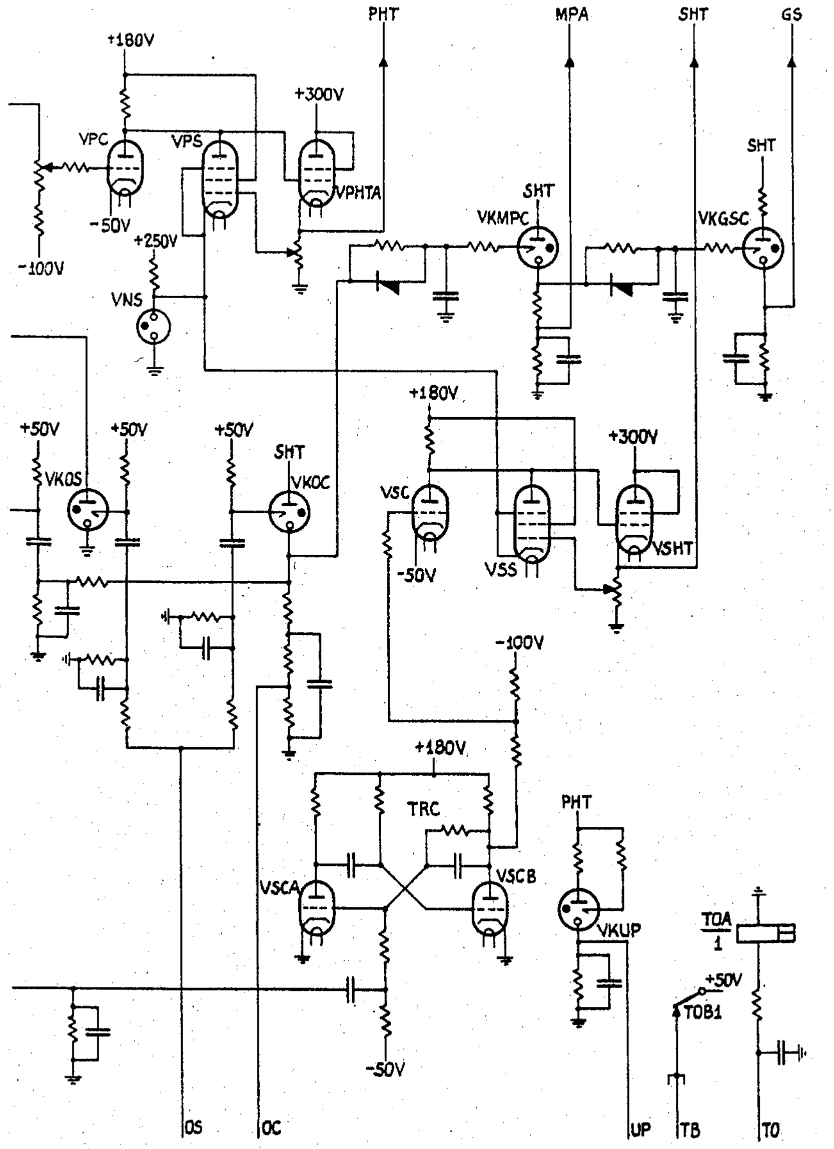
Figure 4:
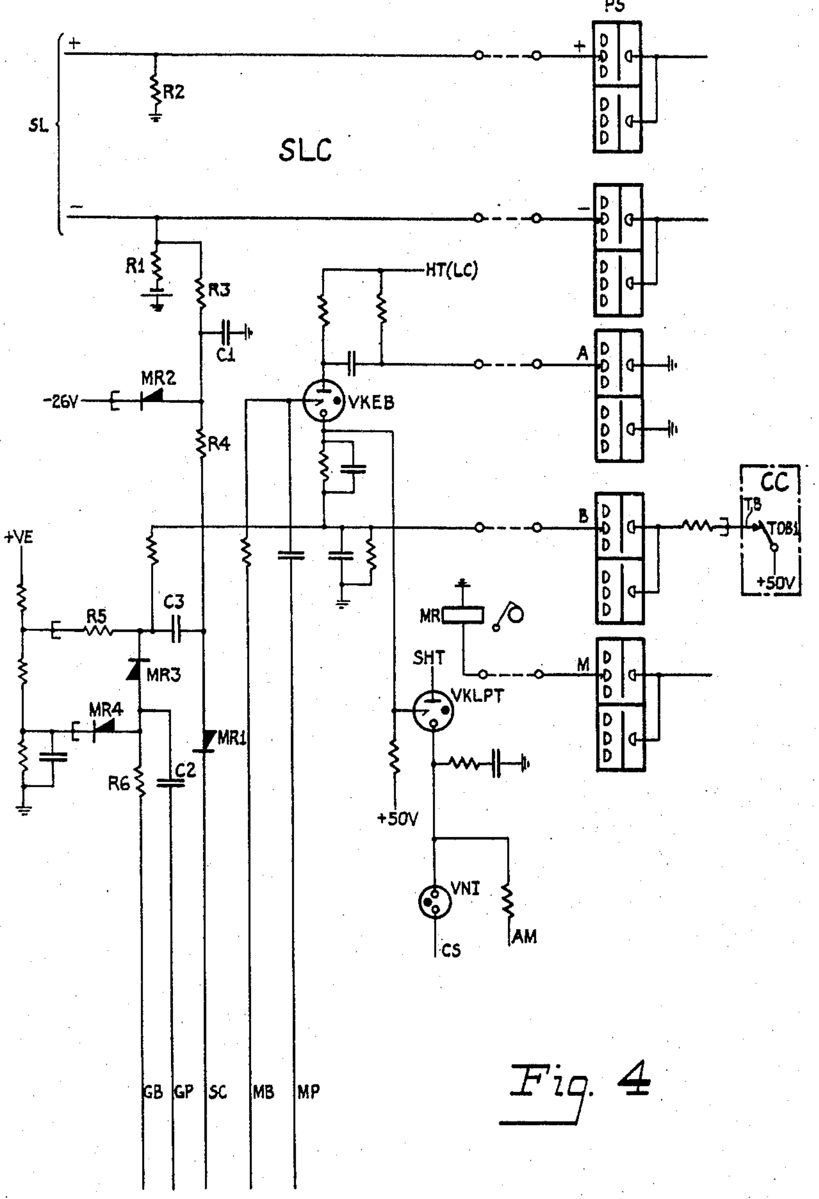
Figure 5:
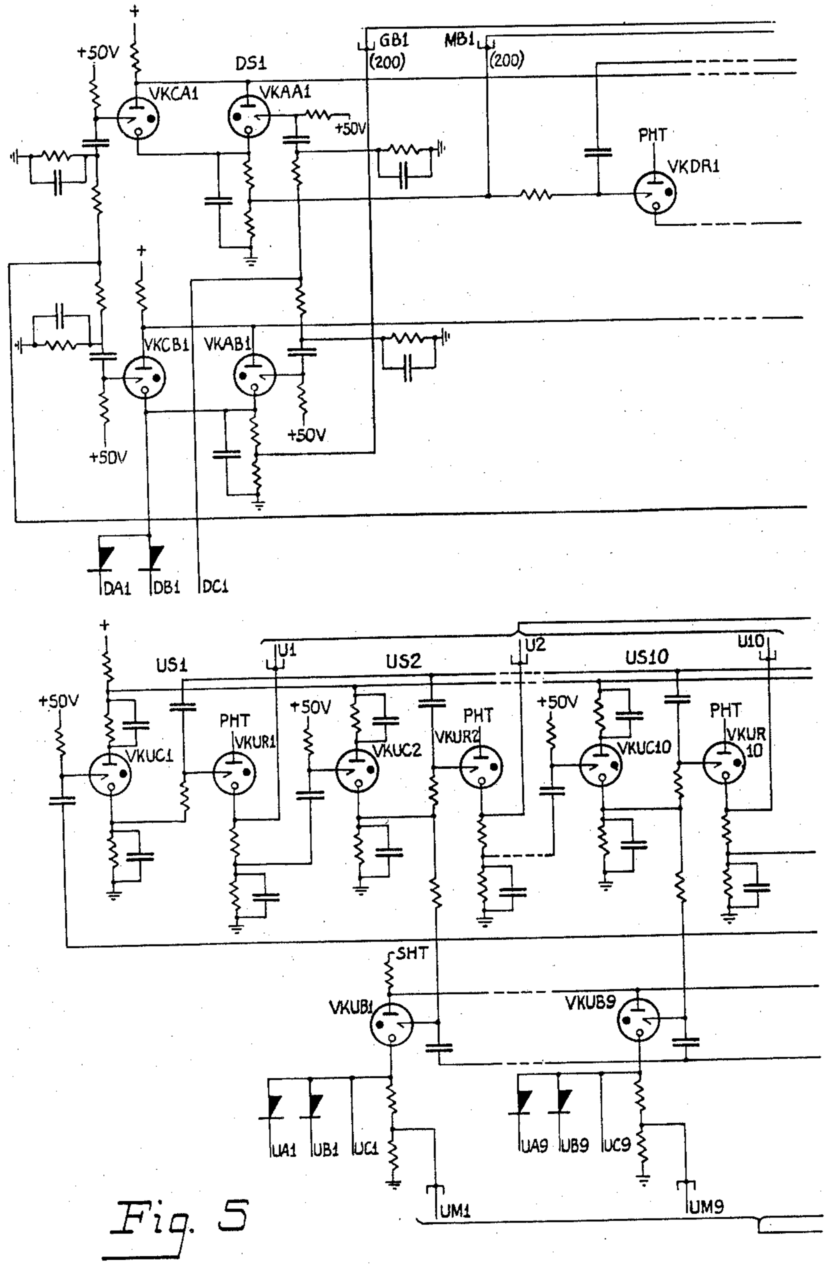
Figure 6:
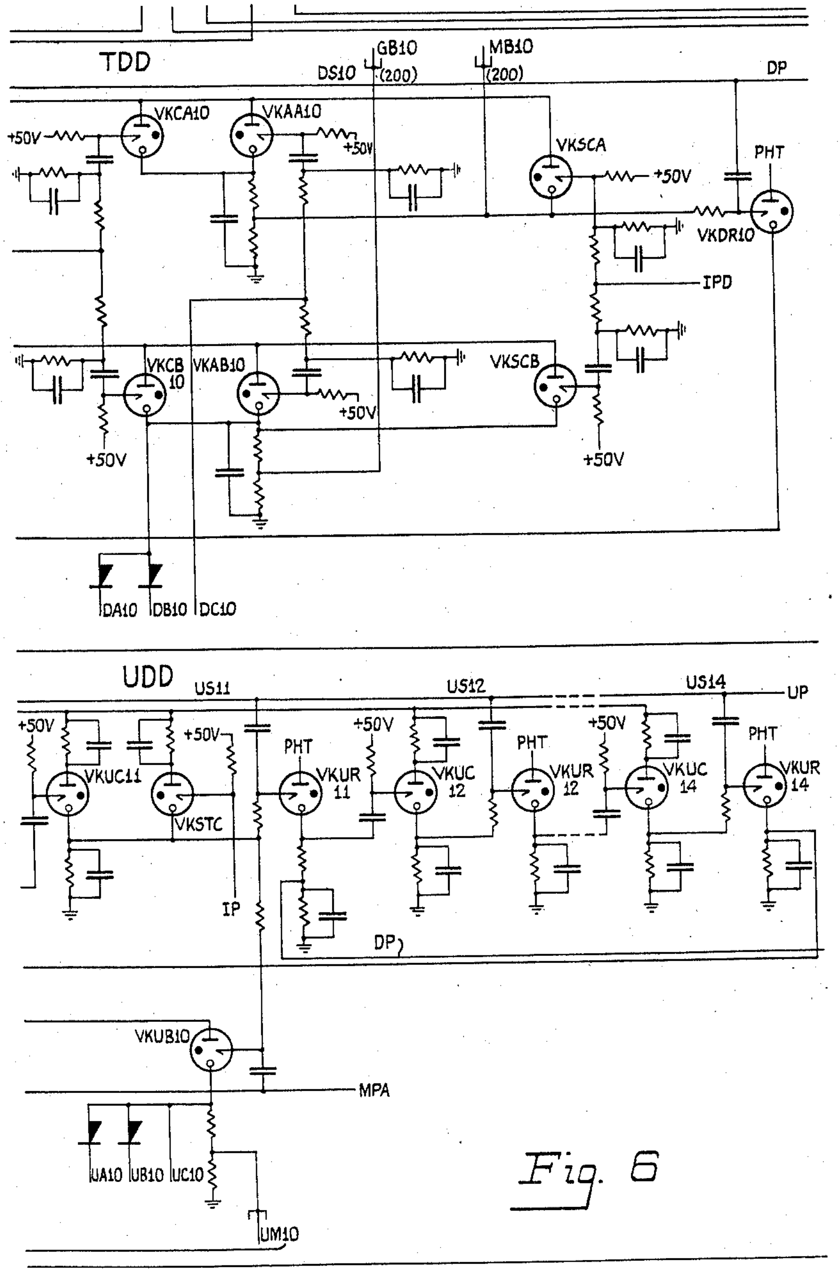
Figures 7, 8:
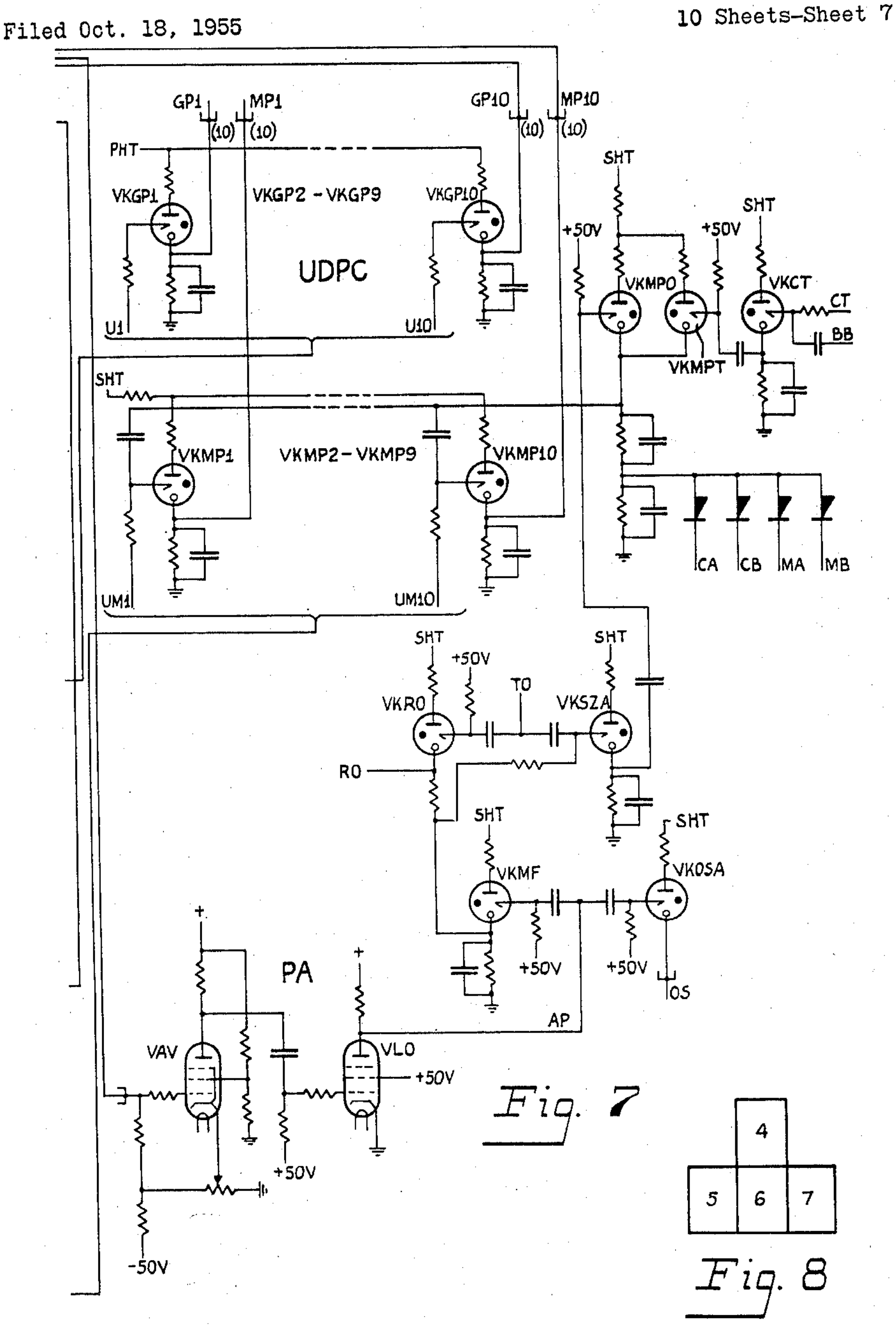
Figure 9:
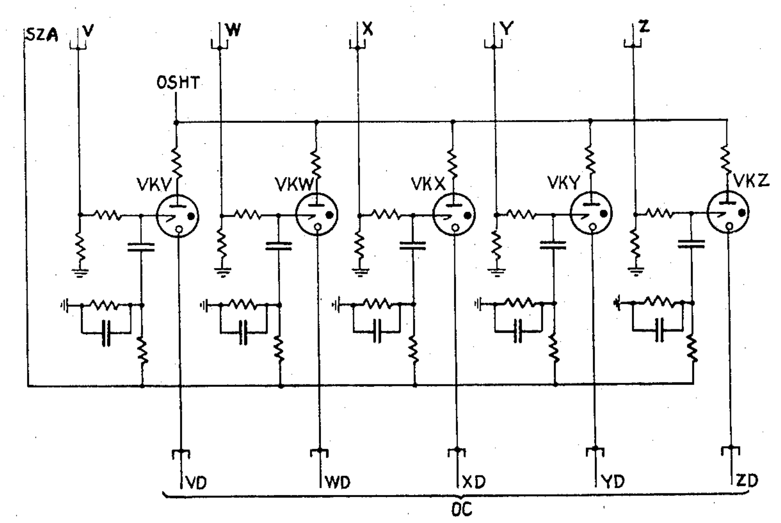
Figure 10:
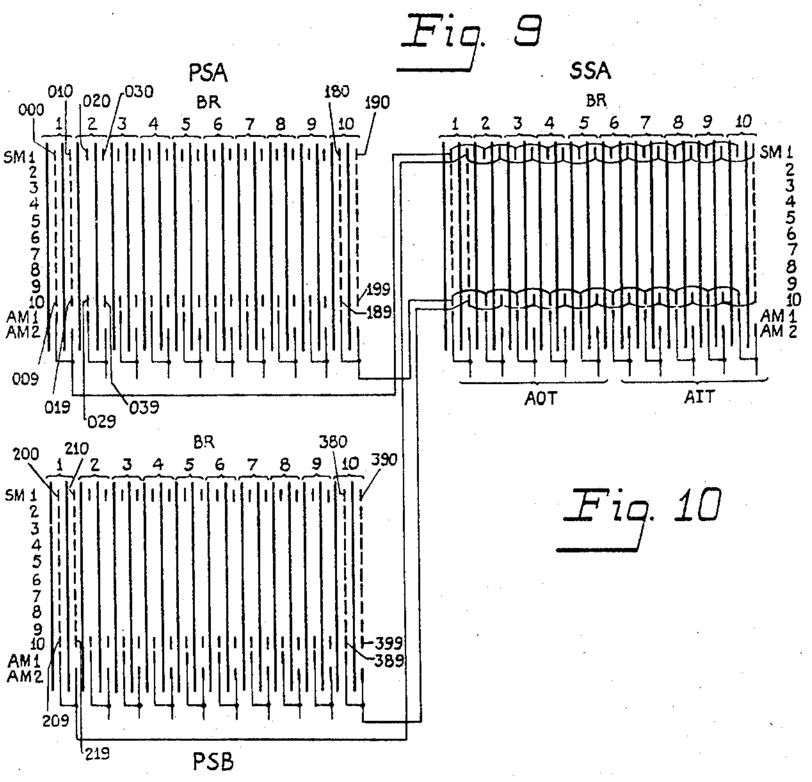
Figure 11:
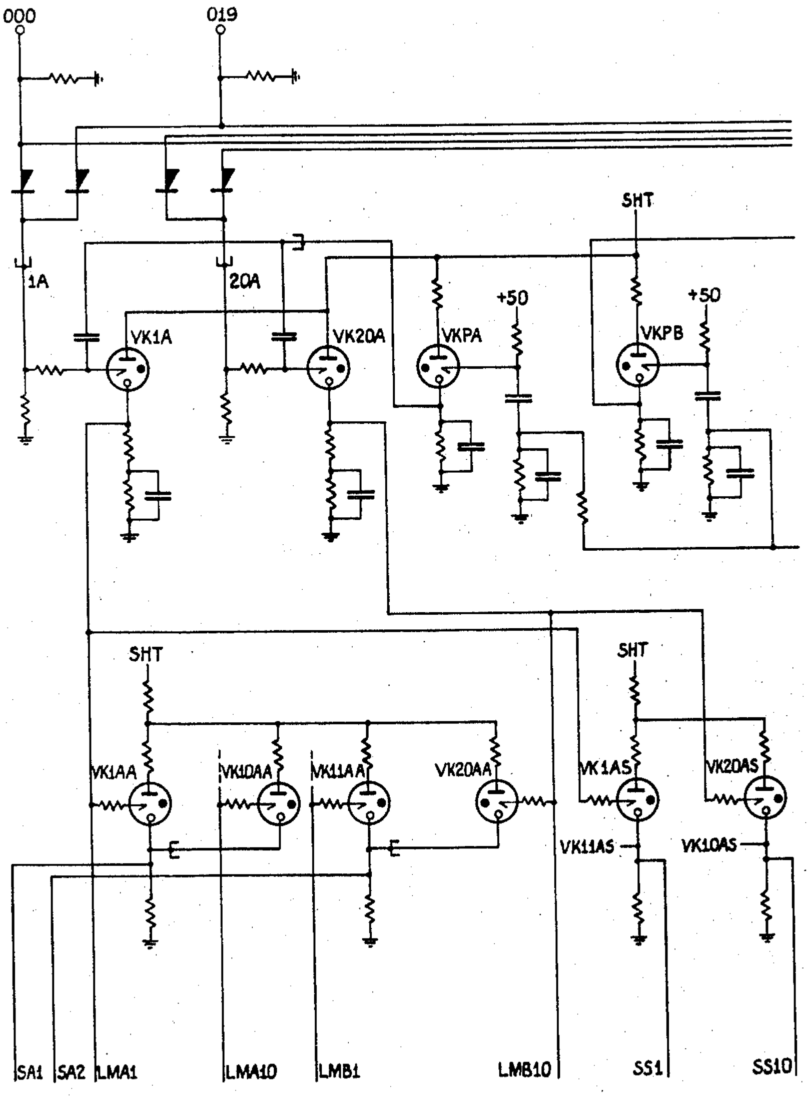
Figure 12:
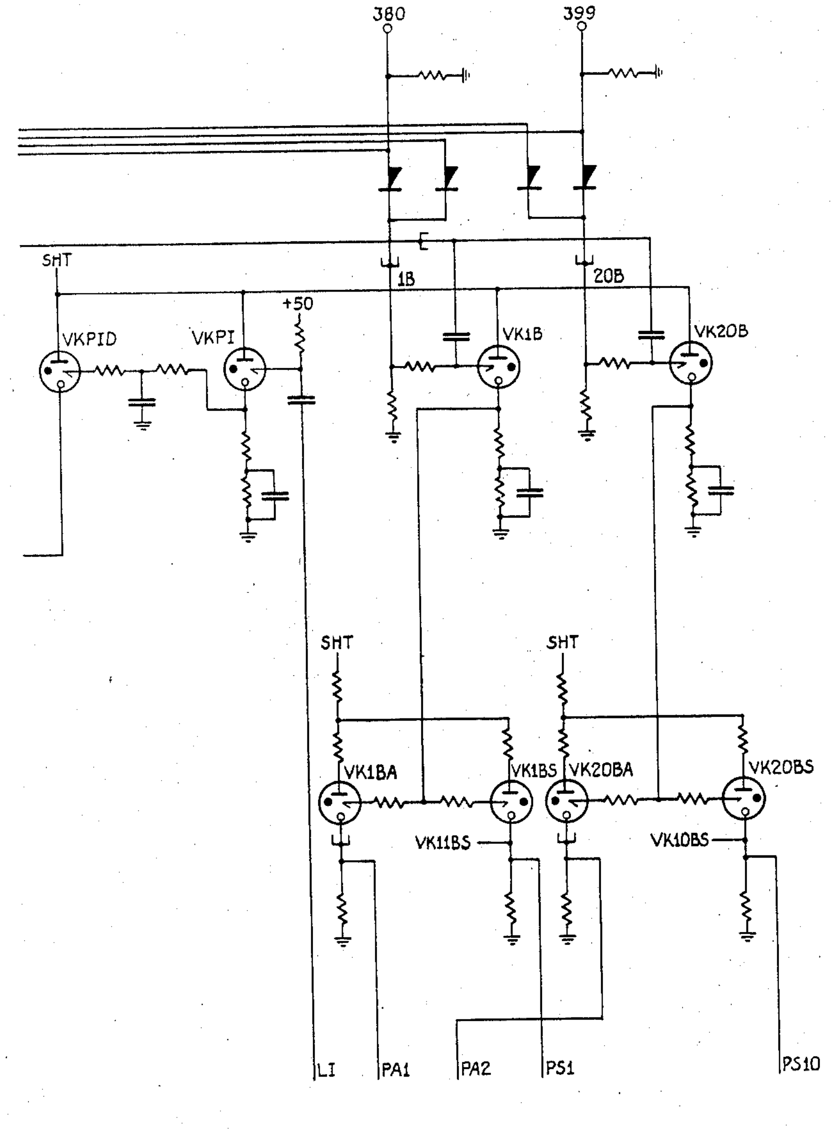

The invention will be better understood from the following description taken in conjunction with the accompanying drawings comprising Figs. 1 to 12. In the drawings:

Figs. 1 to 3 when arranged side-by-side in that order show a 2000-line control circuit, Figs. 4 to 7 when arranged as shown in Fig. 8 show a typical subscriber's line circuit together with scanning and marking arrangements for 2000 lines, Fig. 9 shows a typical encoder circuit, Fig. 10 shows a trunking of one switching unit of a line finder/final selector arrangement employing crossbar switches and to which the invention is applied and Figs. 11 and 12 when arranged side-by-side with Fig. 11 on the left show a 400-line equipment position indicator.

The invention will be illustrated in its application to an electronically controlled automatic telephone exchanges of the type which incorporates line finder/final selectors employing the trunking methods shown in Fig. 10. In describing the invention with reference to such a telephone system, it will of course be understood that the invention is in no way limited thereto.

In an exchange of the aforesaid kind the subscriber's lines are divided in groups of 400 which are served by separate line finder/final selector arrangements each comprising a plurality of so-called switching units embodying a pair of primary switches and a secondary switch. All the switches are of the 12 x 10 crossbar type (twelve select and ten bridge magnets) adapted for double-group working. This technique effectively doubles the capacity of the switches, and accordingly each bridge of a primary switch accommodates 20 subscribers' line circuits, two to each main crosspoint, and therefore two primary switches serve 400 such circuits. The line circuits are given an appearance in each switching unit over straight multiples involving corresponding primary switches. The multipled points of termination of the subscribers' line circuits may be referred to for convenience as equipment positions.

In each switching unit the two primary switches are connected to the secondary switch by a total of 20 links, a link extending from the group switching crosspoints of an individual primary switch bridge and having a separate appearance in each bridge of the secondary switch. The latter switch is adapted to connect any of the 20 links to one of a plurality of originating and terminating trunks each of which is connected to the group switching crosspoints of an individual bridge of said switch.

In the application of the invention to a telephone exchange of the type mentioned, the line finder/final selector stage is divided in 2000-line portions each involving five line finder/final selector arrangements of the aforesaid kind. The line circuits appropriate to each portion would be chosen according to the thousand digit denomination of their directory numbers, thus for example one portion might embrace those line circuits having thousands digits "3" and "4" in their directory numbers. The 2000 subscribers' line circuits involved in an aforesaid portion are divided into twenty blocks of 100 for scanning and marking purposes, and these blocks are formed according to the hundreds digits of the directory numbers. A line intermediate distribution frame (L. I. D. F.) is interposed between the line circuits and the five line finder/final selector arrangements to enable any line circuit to be strapped to any one of the 2000 equipment positions.

In the preferred embodiment of the invention the twenty blocks of 100 subscribers' lines are scanned simultaneously on a 10 x 10 co-ordinate basis until a point in the scan is reached which corresponds to at least one subscriber's line circuit in a call originating condition. The scanning arrangements include two electronic counters one being adapted to distribute bias potentials to line circuits grouped according to the tens digits of their directory numbers and the other being adapted in conjunction with a plurality of so-called units digits pulse control circuits (one for each 100-line block) to apply pulse potentials to the line circuits which are also grouped according to the units digits of their directory numbers. The first counter, hereinafter referred to as the tens digit bias distributor is advanced one stage for each cycle of operations of the second which may be referred to as the units digit pulse and bias distributor. Upon each stage of the tens digit bias distributor becoming operational a bias potential is applied to all those line circuits in the tens digit denomination corresponding to the particular stage. During the period of application of such a bias potential, the units digit pulse and bias distributor performs one cycle of operations during which each of its stages becomes operational successively. When any one of ten stages of the latter distributor is rendered operational it is effective upon each of the 20 units digit pulse control circuits in causing a pulse to be applied to ten line circuits, having directory units digits corresponding to the distributor stage. Thus for example the ten line circuits in each of the 20 blocks having units digit "1" are pulsed together, and it follows that during each period when a tens digit bias is being applied to 10 percent of the subscribers' line circuits all the line circuits have units digit scanning potentials applied to them.

It also follows that line circuits, corresponding as regards their tens and units digits denomination, in each 100-line block are simultaneously subjected to bias and pulse potentials by the scanning arrangements.

When any line circuit subjected to the scan is encountered in a call originating condition, and one in each 100-line block may be so encountered, the pulse and bias are effective in causing a pulse to be extended from the line circuit to the appropriate units digit pulse control circuit. The pulse is utilised to stop the scanning operation and to define the pulse control circuit serving the block containing the calling line circuit. More particularly the defining of the pulse control circuit, marks the corresponding stage of a high-speed hunting circuit having one stage for each pulse control circuit. A starting condition is applied to the hunting circuit a short time after the stopping of the scanner, and when the marked stage, or the first marked stage in order of testing, is encountered, it conditions the units digit pulse control circuit to apply a marking pulse to the particular line circuit. This pulse together with a marking bias, meantime applied to all line circuits having the same tens digit as the latter line circuit by the tens digit bias distributor, singularises the particular line circuit with respect to all the others served by the scanning arrangements and causes it to apply a potential over arbitrary paths to a circuit defining the class of service to be granted to the caller and to a so-called equipment position indicator.

Five equipment position indicators are provided for the 2000-line portion of the exchange and each is associated with a line finder/final selector arrangement. The four hundred points of access to a position indicator are relevant to equipment positions and the marking of one of said points by a singularised line circuit defines the point of termination of the line circuit upon the line finder/final selector arrangement and enables certain functions preparatory to the setting-up of the connection over the switching stage to be effected.

An indication of the identity of the calling subscriber's line is obtained directly from the pulse and bias distributors as regards the tens and units digits, and from the 20-stage high-speed hunting circuit as regards the thousands and hundreds digits.

A control circuit is provided in association with each 2000-line scanning and marking arrangement and this incorporates a pulse generating source, preferably 400 P. P. S., for driving said arrangement, together with means for producing other control pulses. The control circuit is also adapted to test a so-called exchange controller, which is concerned with all call terminations, during the intervals separating the driving pulses, so as to determine whether said controller requires the services of the scanning and marking arrangement for the purpose of singularising a wanted line circuit. In this event the scanning is stopped and then singularisation is effected, according to digital information displayed by the exchange controller, by the application of a marking bias and a marking pulse through the intermediary of the tens digit bias distributor and the units digit pulse and bias distributor together with a particular units digit pulse control circuit.

One of the important functions of the control circuit CC, shown in Figs. 1, 2 and 3, is the control of the scanning arrangements for 2000 subscribers' lines, and accordingly some aspects of this circuit will be described first in some detail. The circuit includes means for generating so-called pulsed high-tension supply which is transmitted over lead PHT to various circuits concerned with line scanning. The pulses of H. T. at 180 volts have durations of 0.625 ms. (milli-seconds) and a recurrence frequency of 400 a second. The 800 C. P. S. symmetrical multivibrator MVA comprising the back-coupled tubes VA and VB provides a basic pulse source for use in the generation of pulsed H. T. The multivibrator is continuously functioning with the two tubes conducting alternately. The potential at the anode of tube VB is positive when the tube is non-conducting and becomes relatively negative when it is conducting. The positive pulses extending over a capacitor are normally effective in rendering tube VPG conducting, the grid of the latter tube being suitably biased to a point slightly below cut-off from a potentiometer which is energised over the supply lead SHT of the so-called switched high-tension source to be referred to later. The negative pulses, which occur 0.625 ms. after the positive pulses mentioned, are applied to a suitable biased rectifier and are received as sharply defined short-duration pulses at the grid of tube VRCB in the bi-stable trigger circuit TRB.

Every positive pulse derived from the multivibrator normally causes tube VPG to conduct and thereupon a negative triggering pulse is applied to trigger circuit TRA. The conditions of tubes VHA and VHB of the latter are transposed by each triggering pulse, the potential at the anode of tube VHB becoming relatively negative during each period of conduction, that is for 1.25 ms. in every 2.5 ms. Negative pulses so derived at 400 a second, are applied through a capacitor to the grid of tube VRCA of trigger circuit TRB so that this tube becomes non-conducting and its partner tube VRCB becomes conducting. However 0.625 ms. after trigger circuit TRB has been so conditioned, a negative pulse from the multivibrator arrives at the grid of tube VRCB and consequently said circuit reverts to its former state. It follows that tube VRCB is rendered conducting and non-conducting successively for periods of 0.625 and 1.875 ms. respectively, the process being repetitive for as long as the gate provided by tube VPG remains open. Accordingly positive pulses of 1.875 ms. duration and having a repetition rate of 400 a second, are produced at the anode of tube VRCB, and are effective in controlling the pulsed H. T. circuit comprising the thermionic tubes VPC, VPS and VPHTA and the cold-cathode diode VNS. Tube VPC conducts for the duration of each positive pulse and therefore the cathode follower tube VPHTA has its current reduced for corresponding periods. The voltage of the output pulses derived from the latter tube is stabilised, at say positive 180 volts, over a wide range of load by tubes VPS and VNS, and the pulses being of 0.625 millisecond duration at 400 P. P. S. are transmitted over the pulsed H. T. lead as the anode supply for certain cold-cathode tubes in circuit incorporated in the line scanning arrangement. The voltage which obtains at lead PHT when tube VRCB is non-conducting is reduced to such a value as will not support conduction of tubes previously fired over this lead. It will also be observed that the pulsed H. T. is also applied to the anode and trigger of the cold cathode tube VKUP which fires due to each pulse and is then effective in extending a positive pulse to lead UP, the supply of pulses over this lead being used for triggering the pulse repeater tubes in the units digit pulse and bias distributor of the scanner.

The pulsed H. T. would be inhibited in the absence of switched H. T. from lead SHT connecting with the grid of tube VPG, or due to the conduction of either of the tubes VKOS and VKTS which share a switched H. T. feeding resistor with the grid of tube VPG. In these circumstances the multivibrator continues to oscillate, but tube VRCB is cut-off and therefore tube VPC conducts to ensure that the cathode follower removes the H. T. output. Tube VKOS is fired when a signal is received over lead OS indicating that the scanning equipment has encountered a calling line. Tube VKTS is fired to stop the line scanning operation by disconnecting pulsed H. T. when the exchange controller requires the use of the scanning circuits to complete a connection to a called subscriber. The control circuit is arranged to test the exchange controller during each of the periods of disconnection of pulsed H. T., i. e. 400 times a second, to determine if it requires to complete a call. During these periods, the trigger circuit TRA extends a positive pulse to a cathode follower tube VCF which feeds the trigger of a cold cathode triode tube VKTCS over a capacitor. The latter tube is only fired if the pulse received from tube VCF coincides with a bias condition received over lead C from the exchange controller, said bias being received at those times when the exchange controller is itself requiring the services of the scanning equipment for completion of a call to a subscriber in the particular 2000 line group served by the control equipment. If tube VKTCS is fired a triggering pulse is applied to tube VKTS which biases off tube VPG so that the pulsed H. T. remains disconnected. Thus the control circuit enables the marking of any called subscriber's line circuit to be effected at 2.5 milli-seconds intervals.

The method of controlling, with the control circuit, the switched high-tension supply will now be described. This supply is fed to lead SHT from the cathode follower tube VSHT and serves many of the circuits in addition to being applied, over leads bearing the same reference, to many of the cold cathode triode tubes in the control circuit itself. The conduction or otherwise of the cathode-follower tube is controlled by tube VSC, and the voltage of the supply is stabilised, substantially at 180 volts positive with respect to earth, by the pentode tube VSS and the cold cathode diode tube VNS. The removal of switched H. T. is of course a convenient method of extinguishing those tubes which are dependent upon it.

In the normal course of events, when the line scanning arrangements and an originating controller have completed their functions with reference to a call origination, the switched H. T. is removed with the minimum of delay, for 3 ms. for circuit re-setting purposes. The completion of said functions is evidenced by the reception of bias and pulse potentials over leads RB and OR respectively from the originating controller, whereupon tube VKOR is fired. A pulse then obtained from the cathode of the latter, fires tube VKORM which applies a positive-going pulse over separate capacitors to the triggers of tubes VKTR and VKTOR of which the former alone is caused to fire. Tube VKTR thereupon causes VKTRM to conduct and a positive pulse, developed at the cathode load of the latter, which load is shared with tubes VKRA, VKRB and VKRC, is applied over a capacitor to the grid of the normally non-conducting tube VSCA of the flip-flop circuit TRC. The applied pulse serves to transpose the conditions of tubes VSCA and VSCB for 3 ms., and for this period the more positive anode voltage of the latter tube enables tube VSC to conduct. This is effective upon the grid of the cathode follower tube VSHT in causing the voltage output of the tube to be reduced for a corresponding period to such a value as will not support conduction of any tubes served by it.

The switched H. T. may also be interrupted by the reception of a triggering pulse over lead RA, and this would occur in the event of the high-speed hunting circuit failing to encounter a hundred line group containing calling subscriber, the hunting circuit having been started upon the line scanning arrangement detecting a subscriber's line in the calling condition. In this event the pulse at lead RA fires tube VKRA which triggers the flip-flop circuit TRC to produce a 3 ms. interruption of the switched H. T. as before.

Continuing with the description of the 2000-line control circuit, if a calling line is found by the scanning arrangements, as evidenced by the reception of a pulse over lead OS and this is not duly following by pulse and bias potentials over leads OR and RB to indicate that the originating controller has completed its function, a 3 ms. disconnection of switched H. T. takes place after a delay of approximately 230 ms. after receipt of a pulse over lead OS. This facility, which corresponds to "forced release," prevents undue holding of common equipment due to the fault condition. This circuit operation will now be described. The positive pulse received over lead OS, besides firing VKOS to inhibit the pulsed H. T., causes tube VKOC to conduct. A positive pulse thereupon derived from the cathode of tube VKOC, causes tube VKORC to fire and this in turn fires tube VKRDA. Thereupon a capacitor associated with the trigger of tube VKRDB proceeds to charge over a suitable series resistor due to the positive potential obtaining at the cathode of tube VKRDA. It may be noted that the resistor has a rectifier connected across it in such a sense as will permit rapid resetting of the timing circuit, constituted by the resistor and capacitor, when tube VKRDA becomes non-conducting due to normal or delayed disconnection or switched H. T. If the switched high tension supply over lead SHT persists, after a delay of about 230 milli-seconds the charge acquired by the capacitor will be such that the potential on the trigger of tube VKRDB will be sufficient to fire the latter tube, and thereupon tube VKRC will be fired. A positive pulse from the cathode of tube VKRC is then extended over a capacitor to the flip-flop circuit TRC which brings about disconnection of switched H. T. for 3 ms. as already described.

Another function of the 2000-line control circuit is its production of pulses on demand at leads MPA and GS which are to be used respectively for the control of the marking tubes in the units digit portion of the scanning equipment and for starting of the high-speed hunting circuit associated with each of hundred-line group pulse control circuits. As already mentioned, when a calling line has been encountered by the scanning arrangements, a triggering pulse is received over lead OS and therefore the control circuit removes the pulsed H. T. supply, and initiates the delay (230 milliseconds) disconnection of the switched H. T. supply. Tube VKOC, which is concerned with the latter function, upon firing, due to the pulse at lead OS, causes a bias potential to be applied over lead OC to the originating controller access equipment and this condition partially constitutes a demand for the services of the originating controller. The positive potential obtaining at the cathode of tube VKOC is also extended over a timing resistor, having the usual rectifier across it for timing circuit re-setting purposes, to a capacitor associated with trigger of tube VKMPC. This tube fires after 2.5 milli-seconds, and a positive pulse derived from its cathode circuit is applied to lead MPA. The cathode of tube VKMPC is also connected to the trigger of tube VKGSC over another delay circuit, and the latter tube therefore fires after a further 7.5 milli-seconds whereupon a positive pulse is connected to lead GS to start the high-speed hunting circuit. Thus when the line scanning equipment encounters a calling subscriber's line circuit pulses are applied to leads MPA and GS after 2.5 and 10 ms. respectively.

Some aspects of the operation of the 2000-line control circuit relating to terminating calls will now be described, and in this connection it has already been mentioned that the control circuit is adapted to test for a demand from the exchange controller, which is concerned with terminating calls, during each of the periods of disconnection of pulsed H. T. Moreover it has been shown that when such a demand occurs tube VKTCS is fired so that the pulsed H. T. is suppressed. Tube VKTCS also fires tube VKTSZ which causes a pulse to be extended to lead SZ of the exchange controller to confirm seizure of the control circuit. The anode supply over lead HT(EC) to tube VKTSZ is obtained from the exchange controller and also the cathode lead of the same tube is located in said controller. Also with tube VKTCS in the conducting state, tube VKF is primed in readiness to be fired by a condition to be received over lead F from the exchange controller when the latter is ultimately ready to release. Thereupon the firing of tube VKF would cause conduction of tube VKFM which would bring about the triggering of tubes VKTR and VKTRM in that order. The latter then initiates the usual 3 ms. interruption of switched H. T., for circuit resetting purposes, through the intermediary of flip-flop circuit TRC.

Another effect of firing tube VKTCS upon seizure of the control circuit by the exchange controller is to fire tube VKTRC which extends a firing pulse to VKRDA which starts that circuit (already mentioned) which would result in the interruption of switched H. T. after a 230 milli-second delay. The latter condition would only mature however, if under a condition of fault, a pulse did not intervene at lead F due to the release of the exchange controller.

The firing of the tube VKTCS also charges the capacitor associated with the trigger of tube VKBA, over a timing resistor which has the usual resetting rectifier connected across it, and after a delay of some 2.5 milli-seconds the latter tube conducts to apply a bias potential to lead BA. This lead extends to the terminating access equipment, and the bias potential is effective in conditioning said access equipment to transfer digital information from the exchange controller to the marking tubes associated with the scanning equipment for the purpose of defining the wanted subscriber's line circuit. With tube VKBA in the conducting state, a further timing capacitor connected to the trigger of tube VKBBD proceeds to charge, and after another period of 10 milli-seconds the latter tube is fired. Thereupon a pulse is applied over lead BB to all the units digit pulse control circuits in the 2000 line group, and moreover a firing pulse is applied to tube VKBR which is coupled to tube VKTOB by the common anode resistor. Tube VKTOB is concerned with the trunk-offering facility, and when it is rendered conducting, as it would be over lead TOB from the exchange controller in the event of the latter being employed by an operator for the purpose of establishing a call to a busy subscriber, relay TOB forming part of the cathode load is operated. Under these circumstances therefore, the firing of tube VKBR by tube VKBDB some 12.5 ms. after seizure of the control circuit by the exchange controller would bring about the extinguishing of tube VKTOB and therefore the release of relay TOB.

When the control circuit is taken into use from the exchange controller by an operator for the purpose of establishing a call to an engaged subscriber (i. e. trunk offering), the high-speed relays TOB and TOA are operated over leads TOB and TO respectively. The former is operated through the intermediary of tube VKTOB and is only released, as already described, when tube VKBR is fired some 12.5 ms. after seizure of the control circuit, whereas relay TOA is released somewhat earlier. During the operated period of relay TOB, its contacts TOB1 remove 50 volts positive potential from lead TB which extends to all the primary switches of the line finder/final selectors serving the particular 2000 lines. The disconnection of lead TB causes the guarding condition to be removed from all those line circuits which are already involved in connections. During the short period which relay TOA is operated, its contacts TOA1 disconnect the 180 volts positive supply from lead HT(LC), and employ said supply for backing-off tube VKTR and for priming tube VKTOR. Lead HT(LC) is the anode supply lead for a cold-cathode tube in each of the 2000 subscribers' line circuits, the tubes being arranged, when in their conducting states, to guard the relevant circuits against intrusion. In the normal course of events such a tube becomes conducting shortly after a subscriber initiates a call and remains so until a primary switch of the line finder/final selector has established a connection to the relevant line circuit whereupon a permanent guarding condition, extending from lead TB of the control circuit would become effective. However, the momentary disconnection of lead HT(LC) results in the sustained deionisation of any of said tubes which may be conducting and this operation, together with the disconnection of lead TB by relay TOB ensures that all the line circuits are unguarded and are therefore accessible to the calling operator. It will be noted that relay TOA in releasing prior to relay TOB re-connects the anode supply to the previously mentioned tubes of each line circuit in readiness for the firing by the exchange controller of such a tube in the required line circuit to initiate the setting up of a crossbar switch connection from the operator to that line circuit.

In the case of trunk-offering, the disconnection of switched H. T. by the control circuit is deferred for approximately 200 milli-seconds after the reception of a pulse over lead F from the exchange controller when the latter is ready to release. This pulse would be received whilst relay TOA is still operated, and is effective in firing tubes VKF and VKFM in turn. The positive pulse derived from the cathode of the latter, triggers tube VKTOR which is primed over the operated contacts TOA1. The raised cathode potential of tube VKTOR permits the capacitor, associated with the trigger of tube VKRD, to charge over a timing resistor, and after a delay of some 200 ms., tube VKRD is fired. This strikes tube VKRB which activates the flip-flop circuit TRC to introduce the 3.0 milli-seconds interruption of switched H. T. The delay in interruption of switched H. T. gives adequate time for the establishment of a connection between the operator and the required line circuit under all circumstances.

The scanning arrangements associated with the subscribers' line circuits will now be described with reference to the circuits shown in Figs. 1 to 7. In these drawings a subscriber's line circuit SLC is represented, together with a tens digit bias distributor TDD, a units digit pulse and bias distributor UDD, and a units digit pulse control circuit UDPC. Both distributors serve 2000-line circuits which for scanning purposes are arranged in twenty blocks of 100. A units digit pulse control circuit with an amplifier PA is provided for each of the 100 line blocks. The control circuit which has already been described works in conjunction with the above circuits.

The subscriber's line circuit SLC has a multiple appearance upon primary switches such as PS forming part of a line finder/final selector switching arrangement, catering for 400 subscribers' lines, five such switching arrangements serving the 2000-line portion of the exchange. The 100 lines of each group forming the 2000-line portion are simultaneously scanned in accordance with the last two digits of their directory numbers irrespective of their points of termination upon a line finder/final selector multiple. For this purpose the bias leads GB and the pulse GP of the 100 circuits of each group are arranged in a 10x10 co-ordinate, the GB leads of 200 line circuits, in the 2000 line portion of the exchange, having the same tens digit being commoned and the GP leads of ten line circuits in each 100-line group separately having the same units digit, also being commoned. Further leads MB and MP of each 100 line group, which are arranged to supply tens digit bias and units digit pulse potentials respectively are also arranged on a 10x10 co-ordinate basis and accordingly they are commoned in a similar manner to leads GB and GP respectively.

Referring to the subscriber's line circuit, upon a call being originated current flow through resistors R1 and R2 and the looped line SL raises the potential at resistor R1, and this condition is extended over resistors R3 and R4 to rectifier MR1 but is not otherwise effective since the latter is backed-off by a potential extending over lead SC from the amplifier PA associated with the units digit pulse control circuit. Rectifier MR2 extending to a source of negative potential is included for line resistance compensation purposes, whereas capacitor C1 is intended to absorb line pulses which might simulate a calling condition. When the scan reaches the particular calling line, a positive bias potential persisting for the duration of a units digit scanning cycle and extending from the tens digit distributor TDD is connected to lead GB and a positive pulse from the units digit pulse control circuit UDPC is transmited over lead GP. The bias opens the gate comprising rectifier MR3 and resistor R5, the latter deriving a positive potential from a potentiometer arrangement common to the 100 lines. The pulse from lead GP is therefore transmitted over capacitors C2 and C3 to rectifier MR1. It is to be noted that the potentiometer provides a bias to rectifier MR4 which acts as a limiter for the GB bias and GP pulse potentials. However, the GP pulse together with the calling line bias are now sufficient to overcome the backing-off potential applied to rectifier MR1, and the pulse is therefore extended over lead SC to the amplifier PA in the common equipment so as to terminate the scanning operation.

Concurrently with application of bias potential to lead GB of all those line circuits in the twenty 100 line groups having the same tens digit (digit "1" in the example) another bias is applied to the corresponding lead MB. This potential primes the cold cathode triode tube VKEB which is eventually fired by a pulse received over lead MP from the units digit pulse control circuit as a result of the marking applied over lead SC to the amplifier when the calling line was encountered. Tube VKEB derives its anode supply HT(LC) from the control circuit CC and it will be recalled that this supply is arranged to be temporarily removed under trunk-offering conditions only. A firing pulse obtained from the cathode load of tube VKEB when it conducts, is applied to the trigger of the permanently primed tube VKLPT which obtains its anode potential over the switched H. T. supply lead SHT from the 2000-line control circuit. Tube VKLPT remains conducting until the switched H. T. is interrupted and, during its period of conduction, the voltage rise at its cathode is extended over a resistor to lead AM and thence over arbitrary paths to a co-ordinate marking field which is employed to indicate the location of the subscriber's line with respect to the line finder/final selector stage, and also to define those paths through said stage which are available to the caller. Also whilst tube VKLPT is conducting, the diode tube VNI is fired so that a pulse is extended over lead CS and is effective upon a class of service discriminating circuit. The pulse over lead CS is also effective, together with a bias produced at lead OC of the 2000-line control circuit, in initiating connection to the originating controller over its access equipment.

Also due to the firing of tube VKEB a positive potential, derived from its cathode load, is applied over a resistor to gate rectifier MR3 so that this gate is effectively blocked. Thus the line circuit is temporarily guarded against intrusion by the scanning arrangement when the latter is re-started after a short interval for the purpose of dealing with other calling lines. It should be understood that when a connection to an originating trunk relay set and a register is eventually established from the line circuit by way of the line finder/final selector stage, the particular primary switch PS concerned applies earth to lead A, whereupon the sudden drop in potential at the anode of tube VKEB extinguishes that tube. However the extinguishing is ineffectual since the primary switch also connects +50 volts to lead B to maintain a backing-off condition at rectifier MR3 and this condition is normally maintained for the duration of the call.

Resistors R1 and R2 of the subscriber's line circuit, which are permanently connected to line, are of such values as not to interfere perceptibly with dialled impulses transmitted by the subscriber's instrument to the register which is taken into use initially over the line finder/final selector.

The line circuit includes the usual subscriber's meter MR which responds to pulses received over lead M.

When a call origination or call termination within the 2000-line group is not being handled, the units digit pulse distributor UDD and the tens digit bias distributor TDD, which comprise closed rings of counting stages, are cyclically operating. The units digit distributor has fourteen stages US1 to US14 of which some are omitted for simplicity, and each of these stages consists essentially of a count tube VKUC1, VKUC2 . . . VKUC14 and a pulse repeater tube VKUR1, VKUR2 . . . VKUR14. The count tubes and the pulse repeater tubes make up the counting chain proper, and the various stages of the chain are rendered operative successively at 400 stages per second under control of triggering pulses and H. T. pulses received over leads UP and PHT respectively from the previously described control circuit. The pulsed H. T. is applied to the anodes of all the pulse repeater tubes for 0.625 ms. periods at 400 P. P. S., and a triggering pulse is applied over separate capacitors to the trigger electrodes of said tubes during each of the H. T. pulses. The eleventh stage US11 of the distributor incorporates an additional tube VKSTC having a common cathode circuit with the count tube VKUC11 of that stage, and this additional tube is fired by a pulse received over lead IP when it is required to start the distributor initially.

A second series of ten tubes VKUB1 to VKUB10 is associated with the counting ring, and these tubes are connected with the cathodes of the count tubes of stages US2 to US11 respectively.

The count tubes VKUC1 to VKUC14 are arranged to be mutually extinguishing by reason of the common anode load resistor and the separate resistor/capacitor cathode loads. The raised cathode potential of the count tube which is in the conducting state primes the trigger electrode of the allied pulse repeater tube and therefore the latter tube strikes due to the joint effect of the next occurring H. T. and triggering pulses received over paths PHT and UP respectively. Upon the pulse repeater tube striking, and this condition will persist for the duration of pulsed H. T., a sharp positive pulse is extended from its cathode circuit over a capacitor to the trigger electrode of the count tube of the succeeding stage, and this tube now strikes since it is permanently primed from a +50 volts source. The striking of the latter count tube extinguishes the preceeding count tube, and causes a priming bias to be applied to its associated pulse repeater tube whereupon said pulse repeater tube strikes in response to the next pulses received over leads PHT and UP. The whole process is repeated stage by stage for as long as the driving pulses continue to be applied, and it will be observed that, during the periods of conduction of each pulse repeater tube VKUR1 to VKUR10, a positive potential is applied to the corresponding one of leads U1 to U10. Moreover whilst each of the count tubes VKUC2 to VKUC11 of stages US2 to US11 are conducting a priming potential is applied separately to the corresponding one of tubes VKUB1 to VKUB10.

Each time the pulse repeater tube VKUR11 of the eleventh stage becomes conducting a driving pulse is communicated over lead DP to the tens digit bias distributor TDD. Stages US12 to US14 are included in the counting chain to ensure that said driving pulse has been fully effective before stage US1 again becomes operative.

Now leads U1 to U10 of the UDD extend to corresponding leads in each of 20 units digit pulse control circuits such as UDPC, and likewise leads UM1 to UM10 extend from the cathode loads of the second series of tubes VKUB1 to VKUB10 to corresponding leads in the 20 pulse control circuits. Each of the 20 units digit pulse control circuits serves a different group of 100 subscribers' line circuits over two sets of output leads GP1 to GP10 and MP1 to MP10. In the typical units digit pulse control circuit shown, lead GP1 is connected to the units digit scanning lead GP of the ten line circuits in the particular group having units digit "1" in their directory numbers, whereas leads GP2 to GP10 are associated with scanning leads of line circuits in the group having units digits "2" to "0" respectively. The units marking pulse leads MP of the various line circuits in the group are associated with leads MP1 to MP10 in the same manner.

The units digit pulse control circuits such as UDPC each include two series of ten cold-cathode triode tubes VKGP1 to VKGP10 and VKMP1 to VKMP 10, only the first and last being shown in each case. The anodes of tubes VKGP1 to VKGP10, in each pulse control circuit, are fed from the previously mentioned pulsed H. T. supply (400 P. P. S.) over lead PHT. The H. T. pulses, together with pulses distributed to leads U1 to U10 successively during the periods of conduction of the pulse repeater tubes of the units digit distributor, cause tubes VKGP1 to VKGP10 to conduct for successive periods, corresponding tubes in each pulse control circuit being rendered conducting at the same time. When each of the latter tubes becomes conducting a positive pulse, developed at the cathode, is extended to the relevant one of common leads GP1 to GP10, and thus as each unit digit pulse control circuit proceeds with its stage by stage operation, the pulse leads GP of the associated 100 subscribers' line circuits are pulsed, ten at a time, in accordance with the units digits of their directory numbers.

Reference will now be made to the line scanning function of the tens digit bias distributor TDD. This circuit has ten stages DS1 to DS10, of which only the first and last are represented, and each stage comprises essentially two count tubes VKCA1 and VKCB1 . . . VKCA10 and VKCB10, each pair of count tubes having an allied pulse repeater tube VKDR1 . . . VKDR10. The tubes VKCA1 to VKCA10, forming one set, are mutually extinguishing due to the common anode feed resistor and the separate anode loads, and tubes VKCB1 to VKCB10 form a separate set arranged in a similar manner.

Each stage of the tens digit bias distributor has a further pair of tubes VKAA1 and VKAB1 . . . VKAA10 and VKAB10, and the first tube of each of these pairs has its main gap connected in parallel with that of the corresponding tube of the set VKCA1 . . . VKCA10. Also the second tube of each pair has its main gap similarly connected in parallel with the appropriate one of tubes VKCB1 to VKCB10. The pairs of tubes mentioned are concerned with calls incoming to subscribers in the 2000-line group and are inoperative as regards line scanning and their functions will be described later.

Tubes VKSCA and VKSCB, corresponding to tube VKSTC of the units distributor, are included in the last stage for the purpose of starting the distributor, say, after interruption of the H. T. supply. The tubes are adapted to be fired by a pulse received over lead IPD and serve, in place of the count tube VKCA10, to prime the pulse repeater tube of the stage.

If count tubes VKCA1 and VKCB1 of stage DS1 happen to be conducting, a positive priming bias is applied by the cathode circuit of the former to the trigger electrode of the pulse repeater tube VKDR1 which like all the similar tubes has pulsed H. T. applied to its anode over lead PHT from the 2000-line control circuit. The distributor is however not driven at 400 steps a second even though the pulsed H. T. has a repetition rate of 400 per second. The driving of the distributor is effected by pulses received over lead DP at the rate of one per cycle of operations of the units distributor i. e. every 35 ms. Each pulse is received during a period of application of pulsed H. T. and is effective in firing the previously primed pulse repeater tube VKDR1, which will remain ionized for the duration of the H. T. pulse. When VKDR1 is fired a positive pulse is developed at its split cathode load and is connected over separate capacitors to the permanently primed counting tubes VKCA2 and VKCB2 (not shown) of the next stage. These tubes are therefore fired and the first, which corresponds to tube VKCA1, primes the relevant pulse repeater. By this time the first pair of count tubes have been extinguished, due to the mutually extinguishing feature, and the newly operative stage is ready to respond to the next DP pulse. The distributor then continues to function stage by stage as described in response to successive DP pulses and to the coincident applications of pulsed H. T. Since the tens digit distributor receives a driving pulse every 35 ms. it will run through each complete cycle of operations in 350 ms. and this represents the time taken to scan all the 2000 subscribers' lines.

During each period of conduction of a pair of count tubes in the tens digit distributor, a bias potential derived from their cathode loads is applied separately to the corresponding output leads such as GB1 and MB1, and moreover the lower tube VKCB1 . . . VKCB10 of the particular pair causes a potential to be extended to a pair of rectifiers connected to leads such as DA1 and DB1. It is to be noted that lead GB1 is terminated upon the GB leads of all those 200 line circuits in the 2000-line group having tens digit "1" in the directory number, and that the corresponding leads GB2 to GB10 are similarly terminated with respect to line circuits having tens digits "2" to "0" respectively. Leads MB1 to MB10 are terminated in a similar manner with respect to leads MB of the 2000 subscribers' line circuits.

It will thus be seen that during a period when the count tubes of a particular stage of the tens digit distributor are conducting, 200 line circuits having the appropriate tens digit have biases connected to their GB and MB leads. Moreover the units digit distributor in executing one cycle during said period, causes each of the 20 units digit pulse control circuits to connect scanning pulses to line circuit leads GP on a ten-at-a-time basis, all line circuits having the same units digit being pulsed concurrently. Since all the units digit pulse control circuits are effective concurrently with respect to their individual groups of 100 subscribers' line circuits, it will be understood that a correspondingly numbered line circuit in each of the 20 groups receives a tens digit bias and a units digit pulse simultaneously.

The connections from the tens digit distributor and the typical units digit pulse distributor indicate that the line circuit SLC shown is number "10" in that 100-line group served by the typical pulse control circuit, and the latter circuit will itself be significant of the thousand and hundred digits of the subscriber's directory number. Therefore if the whole scanning arrangement relates to the 2000 lines of the exchange having directory numbers 3111 to 4000, and the particular units digit pulse control circuit UDPC, being the eleventh in the series of 20, deals with numbers 4111 to 4100 in that range, then the line circuit shown would be numbered "4110."

As already described, when the scanning arrangements mark leads GB and GP of a calling but unguarded line circuit the scanning pulse applied to the latter passes through the rectifier gates to lead SC, whence it is applied to the grid of tube VAV of the thermionic amplifier PA which is common to the 100-line group. An amplified pulse is therefore derived from tube VLO and is connected over separate capacitors to the primed tubes VKMF and VKOSA associated with the particular units digit pulse control circuit.

Tubes VKMF and VKOSA, which obtain their anode potentials from switched H. T. controlled by the 200-line control circuit, are fired by the amplified pulse, and the former, by the raising of its cathode potential, simultaneously backs-off tube VKRO and primes tube VKSZA. The latter two tubes, also with anodes supplied from switched H. T., form one stage of a high-speed hunting chain incorporating like pairs of tubes in each of the 20 pulse control circuits of the 2000-line portion of the exchange. Meantime the firing of tube VKOSA causes a pulse to be developed at its cathode load over lead OS in the 2000-line control circuit, and this pulse signifies to said control circuit that a calling line has been scanned, and is effective in ensuring that pulsed H. T. is suppresssed. Accordingly the scanning operation is terminated with the condition of the tens digit bias distributor unchanged from that appertaining when the tens bias was developed. In the units digit distributor however, where a pulse repeater tube was effective in initiating the units digit scanning pulse, the condition obtains where the count tube of the succeeding stage is conducting exclusively and therefore the relevant one of tubes VKUB1 to VKUB10 is primed. Thus in the case of a call originated by the line circuit shown, tubes VKCA1 and VKCB1 of the tens distributor are fired, and in the units distributor tube VKUC11 is fired and tube VKUB10 is primed.

Approximately 2.5 ms. after the application of a pulse over lead OS to the control circuit, indicating that a calling line has been encountered, a positive pulse is returned to lead MPA of the units digit distributor by said control circuit. Lead MPA is connected over separate capacitors to the trigger electrodes of tubes VKUB1 to VKUB10, and the applied pulse strikes that tube which is already primed by a count tube. Thereupon a positive bias potential is connected to the relevant one of the common leads UM1 to UM10, and a positive potential is also connected over individual rectifiers to a pair of leads UA1 and UB1 . . . UA10 to UB10, said pairs of leads extending to a units digit encoder associated with the originating controller. The marking of one of leads UM1 to UM10 causes the relevant one of the tubes VKMP1 to VKMP10 in each of the units digit pulse control circuit to be primed. Thus in the present case tube VKMP10 in each of said circuits would be primed, and leads UA10 and UB10 extending to the units digit encoder would be marked.

In the meantime it will be recalled that the firing of tube VKMF in that particular unit digit pulse control circuit which was concerned in completing the co-ordinate scan of a calling line, resulted in tubes VKSZA and VKRO being primed and backed-off respectively. These tubes constitute one stage of a high-speed hunting chain involving corresponding tubes in each of the 20 pulse control circuits. It should be noted that the order of appearance of the stages in the chain is determined in accordance with the thousand and hundred digits denominations of the subscribers' line circuit groups served by the relevant pulse control circuits. The stage which is included in the first pulse control circuit has its lead TO connected with lead GS of the 2000 line-control circuit whereas each of the remaining stages has its TO lead connected to lead RO of the preceeding stage, lead RO of the last stage being connected to lead RA of the 2000-line control circuit.

Some 7.5 ms. after the priming of tube VKMP10 in each of the pulse control circuits, consequent upon the firing of tube VKUB10 in the unit digit distributor by the pulse received over lead MPA, a triggering pulse is transmitted by way of lead GS of the control circuit to lead TO of the first stage of the high speed hunting chain, thereupon either tube VKRO or tube VKSZA will be fired, according to whether the particular pulse control circuit has encountered a calling line. Thus if the latter circuit has not been so involved, tube VKRO has not been backed-off nor has tube VKSZA been primed, and accordingly the former tube is fired. A triggering pulse is consequently developed at lead RO and this is communicated to lead TO of the next stage where again either tube VKRO or VKSZA is fired. It can be seen that the stages become operative successively until a stage marked by a conducting VKMF tube is reached, and thereupon the primed tube VKSZA is fired instead of tube VKRO. A sharp positive pulse obtained from the cathode of tube VKSZA is effective in firing the permanently primed tube VKMPO in the pulse control circuit. A positive pulse now occurring at the cathode of tube VKMPO is applied over separate capacitors to the triggers of tubes VKMP1 to VKMP10, and that which has already been primed is fired. The firing of this tube (VKMP10 in the present instance) causes a units marking pulse developed at the cathode to be applied over lead MP10 to the MP leads of the ten line circuits in the 100 line group which have units digit "0," and this pulse together with the bias already upon lead MB completes the co-ordinate marking of the individual calling line circuit. Thus the latter circuit is exclusively marked within the 2000-line group.

As already described the bias and pulse conditions applied to the subscriber's line circuit cause the firing tube VKEB which causes tube VKLPT and the isolating diode tube VNI to conduct, and which temporarily guards the line circuit against intrusion when the scan is re-started. Upon conduction of tube VKLPT, its raised cathode potential is applied to lead AM extending to an individual point in the 400 point field of an equipment position indicator. The latter is individual to the 400 line circuits of one of the five line finder/final selector arrangements of the 2000-line portion of the exchange, and the marking applied to it is appropriate to the arbitrary point of termination of the line circuit upon the primary switch multiple. The marking over lead AM therefore determines which links in the line finder/final selector arrangements are accessible to the particular line circuit. Also as already mentioned lead CS of the line circuit, which is marked when tube VNI fires in series with tube VKLPT, is terminated upon a circuit indicative of the class of service to be granted to the caller, there being a separate such circuit in the 2000-line section of the exchange for each class of service to be catered for.

Reverting to the pulse control circuit UDPC, in addition to firing the marking tube VKMP10, tube VKMPO also causes a positive potential to be connected to leads CA, CB, MA and MB by way of individual rectifiers. The first and second pairs of leads extend to hundred and thousands digit encoders associated with the originating controller which is common to the whole exchange.

With further reference to the scanning operation, since the twenty 100-line groups are scanned simultaneously it is possible for a plurality of line circuits having the same ten and unit digits in different groups to be encountered in the call originating condition. In this event the scan is stopped as before, and the tube VKMF is fired in each unit digit pulse control circuit concerned so that the relevant stages of the high speed hunting chain are marked. When a start signal is applied to said hunting chain the pulse control circuit associated with the first encountered stage is utilised to mark the appropriate line circuit. When this marking has been duly effective the hunting chain with its marking tubes is completely reset by interruption of the switched H. T. supply, and the remaining subscribers would be dealt with afresh when the scan is re-started. It will of course be appreciated that the whole cycle of operations is so speedily effected so as not to inconvenience the calling subscribers.

It will be obvious that the identity of the calling subscriber is signified by the positions in which the tens and units distributors are stopped taken in conjunction with the units digit pulse control circuit taken into use for marking purposes over the high-speed hunting chain. This identity information is communicated to the register employed in the setting-up of the call and is subsequently released by the register for use, for example, in automatic ticketing if the call is a long distance one, or for providing a display of the calling party's number at a manual board. For this purpose four originating call encoders OCE such as that shown in Fig. 9 are provided, one being associated with the tens digit distributor, another with the units digit distributor and remaining two with the 20 units digit pulse control circuits.

The tens distributor TDD has ten pairs of identification leads DA1 and DB1 to DA10 and DB10, and the units distributor UDD also has ten pairs of leads UA1 and UB1 to UA10 and UB10, whereas the 20 pairs of MA and MB leads and a like number of CA and CB leads are provided by the pulse control circuits. The reference characters M, C, D and U of the identification leads are significant of thousands, hundreds, tens and units digit denominations respectively. Since the particular 20 pulse control circuits are concerned with 2000 lines having, say, thousands directory digits "3" and "4," all the MA leads and all the MB leads appropriate to the first 10 units digit pulse control circuits are commoned, and likewise the MA and MB leads of the remaining pulse control circuits are commoned. Also the 20 pairs of CA and CB leads are in effect reduced to ten pairs by commoning corresponding leads in the first and eleventh, second and twelfth to tenth and twentieth pulse control circuits.

The utilisation of a two-lead marking for each digit of a decimal denomination provides for conversion to "two-out-of-five" coding, and the following table, which relates to the units digit, shows how the distributor leads are connected to the input leads V, W, X, Y and Z of the relevant encoder:

| Units Digit | Distributor Leads | Encoder Leads | Units Digit | Distributor Leads | Encoder Leads |
|---|---|---|---|---|---|
| 1 | UA1 | V | 6 | UA6 | X |
| | UB1 | W | | UB6 | Y |
| 2 | UA2 | V | 7 | UA7 | V |
| | UB2 | X | | UB7 | Z |
| 3 | UA3 | W | 8 | UA8 | W |
| | UB3 | X | | UB8 | Z |
| 4 | UA4 | V | 9 | UA9 | X |
| | UB4 | Y | | UB9 | Z |
| 5 | UA5 | W | 0 | UA10 | Y |
| | UB5 | Y | | UB10 | Z |

The connections between the identification leads of the tens digit distributor and the relevant encoder follow the same pattern, and similar considerations apply to the hundreds and thousands identification leads although in the latter case connections appropriate to only two digits of the thousand denomination are effected.

It follows that, in the present example of a call origination by subscriber "4110," leads of the various encoders are marked thus:

| Encoder: | Leads biased |
|---|---|
| Thousands digit | V and Y |
| Hundreds digit | V and W |
| Tens digit | V and W |
| Units digit | Y and Z |

The markings constitute bias potentials upon the appropriate ones of tubes VKV, VKW, VKX, VKY and VKZ which all have their anodes supplied over lead OSHT from a source of switched high tension within the originating controller. When a demand, in the form of a pulse at lead SZA in each of the encoders, is received from the originating controller, which is adapted to be taken into use by one 2000-line group equipment at a time, the primed tubes are fired since said lead is connected over separate capacitors to the trigger electrodes. The "two-out-of-five" signals are therefore repeated upon the relevant ones of leads VD, WD, XD, YD and ZD. Each such group of leads extends to a code checking circuit incorporated in the originating controller and thence to the register which has meantime been taken into use for setting up the call.

The operation of the tens and units distributors and the units digit pulse control circuit will now be described with respect to a call to be terminated upon a line circuit in the 2000-line group. As already mentioned, the 2000-line control circuit institutes a test during the periods of disconnection of pulsed H. T., i. e. every 2.5 ms., to determine whether the exchange controller requires to initiate the setting up of a call to a subscriber. In this event pulsed H. T. is suppressed and after an interval of approximately 2.5 ms., a pulse is developed at lead BA of the 2000-line control circuit. This pulse constitutes a demand to access equipment which would be interposed between the exchange controller and leads DC1 to DC10 together with leads UC1 to UC10 of the tens digit distributor and the units digit distributor respectively. The tens and units directory digits of the required subscriber's line circuit are thereupon communicated to the relevant distributor by the application of a positive potential pulse to one in each of said groups of leads.

The energisation of one of leads DC1 to DC10 results in the firing of a corresponding pair of permanently primed tubes VKAA1 and VKAB1 . . . VKAA10 and VKAB10 in the tens distributor. Thus, for example, the first pair would be primed if the tens digit of the required subscriber were "1." If the distributor happens to have been stopped with the count tubes (say tubes VKA10 and VKB10) of another stage in the conducting state then these are now extinguished in accordance with the mutual extinguishing feature of the stages. Thus the tubes fired due to the exchange controller conduct exclusively and positive bias potentials obtained from their cathode circuits are applied to the relevant pair of line marking leads, for example, to leads GB1 and MB1. In the present case of a terminating call, only the latter lead is usefully employed in that the marking potential is extended to leads MB of the 200 line circuits having the appropriate tens digit.

In the units digit distributor, a positive potential applied to one of leads UC1 to UC10 due to the units digit stored by the exchange controller, is effective in producing a positive potential at the corresponding one of leads UM1 to UM10, and accordingly one of tubes VKMP1 to VKMP10 is primed in each of the units digit pulse control circuits.

Some ten milliseconds after producing a pulse at lead BA, the 2000-line control circuit produces a positive pulse at lead BB, and this pulse is received at the corresponding lead BB in each of the 20 units digit pulse control circuits such as UDPC. Meantime one of the circuits alone has received a bias potential at lead CT, the circuit chosen being determined by the exchange controller in accordance with the thousand and hundred digit of the required subscriber's number. The pulse and bias cause tube VKCT in the selected pulse control circuit to fire and a pulse is therefore applied to the then developed trigger electrode of tube VKMPT which fires as it is permanently primed. This tube shares a cathode load with tube VKMPO, and a triggering pulse obtained from the cathode is extended over capacitors to the trigger electrodes of tubes VKMP1 to VKMP10 whereupon that one which has been primed over the units digit distributor is fired. If in the present case tube VKMP10 is rendered conducting, the MP leads of ten line circuits having tens digit "0" would be marked by a pulse over lead MP10 and so the co-ordinate marking of the required line circuit is completed. If the line circuit is not already marked busy by the connection of the 50 volts positive supply to lead B by the control circuit, the pulse and bias cause tube VKEB of the line circuit to conduct, and therefore tubes VKLPT and VNI conduct. Consequently lead AM extending to the equipment position indicator is marked and subsequently a connection would be set-up over the line finder/final selector stage to the line circuit by way of one of the available paths determined by the marking.

The next circuit to be described is the equipment position indicator comprising Figs. 11 and 12 but before proceeding to this it is necessary to understand the trunking employed in the line finder/final selectors. Each line finder/final selector (LF/FS) switching arrangement serves a group of 400 subscribers' line circuits and five such switching arrangements would be associated with 2000 subscribers' lines involved in one scanning and marking arrangement of the kind already described. A line finder/final selector comprises a plurality of switching units such as that shown in Fig. 10 each involving two primary switches such as PSA and PSB and one secondary switch such as SSA, the number of switching units being determined in accordance with total traffic of the 400-line group, and may, for instance, be eight. All the switches are of the 12 x 10 type, i. e. having 12 select magnets and 10 bridge magnets, which are arranged for double-group working. In the drawing the 10 bridges in each switch are designated BR1 to BR10, and the relationship of the select magnets and the crosspoints in the various bridges is denotedby location of references SM1 to SM10 and AM1 and AM2, SM1 to SM10 being appropriate to regular select magnets, whereas AM1 and AM2 refer to the auxiliary select magnets which, together with their associated crosspoints, are concerned with selection as between the sections of each of the other crosspoints. Four hundred positions for terminating subscribers' line circuits are provided by the two primary switches of the switching unit, 20 positions being provided by each bridge, two at each of the regular crosspoints, i. e. crosspoints associated with select magnets SM1 to SM10. The positions are conveniently numbered 000 to 399, primary switches PSA and PSB providing positions 000 to 199 and 200 to 399 respectively, and typical position numbers are included in the drawing. In the line finder/final selector the "A" primary switches, i. e. PSA and those corresponding to it, are multipled together as regards the equipment positions and likewise the "B" primary switches, PSB and the like, are mutipled together separately from the "A" switches so that a line circuit terminated in any position would have one appearance at a corresponding point in each switching unit.

Within each switching unit, ten links extend from each primary switch to the secondary switch, and it can be seen that each subscriber's line circuit, together with nineteen others accommodated on the same primary switch, has access to one link, a similar link being so accessible in each switching unit. Corresponding links from each set of ten are terminated in pairs upon the double contact units of bridge BR1 of the secondary switch. The internal multipling (some of which is shown) between the ten bridges of the latter swicth ensures that, by the operation of appropriate select, auxiliary and bridge magnets, any link may be connected to any one of five outgoing or five incoming trunks designated AOT and AIT respectively. It will be apparent that if the line finder/final selector comprises eight switching units a total of 40 outgoing and 40 incoming trunks is catered for, but it is not necessary that there should be an equal number of the two kinds of trunks. Moreover, the number of trunks may be increased by introducing an auxiliary secondary switch at each switching unit, and in this event the inter-bridge multpling would be extended to the auxiliary switch which would provide access to an additional trunk over each bridge.

The 2000 subscribers' line circuits which are grouped together according to their directory numbers, for scanning purposes as described, may be connected to individual multipled equipment positions in any of the five line finder/final selectors. A distribution field (line intermediate distribution frame) would be interposed between the line circuits and the primary switches and jumpering would enable the assoiciation of line circuits and the equipment position to be effected on an arbitrary basis in accordance with traffic or other requirements. Consequently when a line circuit has been defined as requiring to be connected over a line finder/final selector it is necessary to indicate the points of termination of that line circuit in the line finder/final selector stage to equipment controlling the setting-up of the switches. The equipment position indicators, one of which is shown in Figs. 11 and 12, are provided for this purpose and one of these indicators is associated with each line finder/final selector arrangement serving 400 subscribers, i. e. there are five for a 2000-line portion of the exchange.

The indicator has 400 terminals arranged in groups of 20 which bear numerical reference corresponding to equipment positions of the relevant line finder/final selector arrangement. For simplicity two groups of terminals only, 000 to 019 and 380 to 399, are represented by the first and last terminals of those groups. Having connected a subscriber's line circuit (+, −, A, B and M leads) to the requisite multipled equipment position in the particular line finder/final selector, the previously mentioned AM lead of that line circuit is connected, also over a distribution field, to the corresponding terminal of the indicator appropriate to said line finder/final selector.

In the equipment position indicator, each terminal has the cathode load resistor for tube VKLPT of the relevant line circuit connected to it, and moreover each terminal is connected over an individual pair of isolating rectifiers to one of each of two groups of leads 1A to 20A and 1B to 20B, there being 20 leads in each group. It will be appreciated that the equipment position on the primary switches may be considered as forming a 20 x 20 co-ordinate arrangement, there being 20 primary switch bridges and 20 positions per bridge. In the indicator, leads 1A to 20A and 1B and 20B are related to this co-ordinate arrangement. Accordingly leads 1A to 10A are appropriate to bridges BR1 to BR10 respectively of the "A" primary switches whereas leads 11A to 20A are likewise related to bridges of the "B" primary switches. Furthermore leads 1B to 20B are appropriate to equipment positions on each primary bridge; more specifically leads 1B to 10B are appropriate to positions (000 to 009 . . . 380 to 389) controlled by select magnets 1SM to 10SM respectively in conjunction with an auxiliary magnet AM1, whilst leads 11B to 20B are appropriate to positions (010 to 019 . . . 390 to 399) controlled by the select magnets in the same order but in conjunction with an auxiliary magnet AM2.

Each of the leads 1A to 20A is connected to the trigger electrode of a tube VK1A to VK20A, and likewise leads 1B to 20B connect individually to the trigger electrodes of tubes VK1B to VK20B.

The equipment positions indicator has 44 output leads which comprise (*a*) ten leads LMA1 to LMA10 which each extend to all the "A" primary switches of the particular line finder/final selector; (*b*) ten leads LMB1 to LMB10 which each extend to all the corresponding "B" primary switches; (*c*) two leads SA1 and SA2 and ten leads SS1 to SS10 of which leads SA1 and SA2 are related to the auxiliary magnets AM1 and AM2 respectively in each of the secondary switches, whilst leads SS1 to SS10 are associated with select magnets SM1 to SM10 respectively in the secondary switches, and (*d*) two leads PA1 and PA2 and ten leads PS1 to PS10 which are related respectively to auxiliary magnets AM1 and AM2 and select magnets SM1 to SM10 of all ("A" and "B") primary switches.

Leads LMA1 to LMA10 and LMB1 to LMB10 extend from the cathodes of tubes VK1A to VK20A respectively and also individually to the trigger electrodes of 20 tubes VK1AA to VK20AA and to the trigger electrodes of 20 further tubes VK1AS to VK20AS. The cathodes of tubes VK1AA to VK10AA are commoned to lead SA1 and likewise the cathodes of tubes VK11AA to VK20AA are connected to lead SA2. Tubes VK1AS to VK20AS are arranged in pairs VK1AS and VK11AS, VK2AS and VK12AS . . . VK10TS and VK20AS, each pair sharing a cathode resistor and being connected to one of leads SS1 to SS10.

The cathode of each of tubes VK1B to VK20B of the indicator extends over separate resistors to the trigger electrodes of a pair of tubes VK1BA and VK1BS . . . VK20BA and VK20BS. The cathodes of tubes VK1BA to VK10BA share a load resistor and are commoned to lead PA1, whereas the cathodes of tubes VK11BA to VK20BA are associated with lead PA2 in a similar manner. On the other hand tubes VK1BS to VK20BS are associated in pairs with the ten leads PS1 to PS10, the cathodes of tubes VK1BS and VK11BS being connected to lead PS1, and so on to tubes VK10BS and VK20BS which have their cathodes connected to lead PS10.

All the tubes in the equipment position indicator are cold-cathode triodes and have their anodes fed from the switched H. T. supply of the previously described 2000-line control circuit.

By way of example it will now be assumed that a subscriber's line circuit connected to position "000" of the particular line finder/final selector has been marked for a call origination or termination. In this event a positive potential is developed at terminal "000" of the indicator, due to the firing of the line circuit tube VKLPT, and therefore tubes VK1A and VK1B are primed. At this juncture a positive triggering pulse is received over lead LI, and it may be noted that this lead emanates from the previously mentioned class-of-service circuit, the pulse being developed as a result of the condition applied to said circuit by way of lead CS in the subscriber's line circuit. The triggering pulse fires the permanently primed tube VKPI, and the increase in the cathode potential serves to charge over a limited resistor the capacitor associated with the trigger electrode of tube VKPID.

After a short delay, the voltage at the trigger electrode of tube VKPID becomes sufficiently positive to fire the tube, whereupon the permanently primed tubes VKPA and VKPB are fired. Tube VKPA in striking applies a positive pulse over separate capacitors to the trigger electrodes of tubes VK1A to VK20A, and tube VKPB is similarly effective with respect to tubes VK1B to VK20B. The originally primed tubes VK1A and VK1B are consequently fired, so that the former renders tubes VK1AA and VK1AS conducting and at the same time applies a marking potential to lead LMA1. With tubes VK1AA and VK1AS in the conducting state leads SA1 and SS1 are marked by the positive potentials existing at their respective cathodes. The firing of tube VK1B causes tubes VK1BA and VK1BS to conduct and therefore leads PA1 and PS1 are marked by positive potentials.

The position now is that leads LMA1, PA1, PS1, SA1 and SS1 are marked, and the uses to which these markings are put will now be briefly described. The marking at lead LMA1 is used to determine if the link extending from bridge BR1 of each primary switch "A" (equipment positions 000–019) in each switching unit is available for possible use, and it will be understood that under other circumstances leads LMA2 to LMA10 would perform similar functions with respect to the other links of the "A" switches, just as leads LMB1 to LMB10 are concerned with determining the idle or busy condition of the links extending from the "B" switches. The potentials at leads PA1 and PS1 respectively prepare tentative operating paths for the auxiliary magnet AM1 and select magnet SM1 in every primary switch. The potential marking at leads SA1 and SS1 determines that auxiliary magnet AM1 and select magnet SM1 in each secondary switch shall be defined for possible operation.

The condition now existing within the 400-line line finder/final selector is that the idle links which are accessible to the line circuit are marked, magnets SM1 and AM1 in each primary switch of the 400-line line finder/final selector are prepared for possible operation, and in each secondary switch the magnets SM1 and AM1 (relevant to accessible links) are also tentatively prepared for operation. Thus when a particular outgoing or incoming trunk terminated upon any of the switching units has been selected for use (by means not shown), it will follow that a connection is required to be set-up to the marked subscriber's line circuit over a particular switching unit. Thereupon control equipment associated with the line finder/final selector brings about the operation of the previously defined select auxiliary and bridge magnets in said particular switching unit, and moreover the primary switch bridge magnet appropriate to the link to be used is operated together with the secondary switch bridge magnet appropriate to the chosen trunk. The connection would ultimately be maintained in known manner by the bridge magnets which alone remain energised.

What is claimed is:

1. In a telephone exchange, apparatus comprising a plurality of subscribers' line circuits arranged in a plurality of groups of the same size, high speed scanning equipment provided in common to said plurality of line circuits and arranged to scan simultaneously corresponding line circuits in all said groups to detect a calling condition, means responsive to said scanning equipment encountering a line circuit in a calling condition in at least one of said groups of line circuits for terminating the scanning operation and means effective in the event that a line circuit in more than one of said groups of line circuits is encountered in a calling condition for singularising one of said calling line circuits.

2. In a telephone exchange, apparatus comprising a plurality of subscribers' lines, a plurality of line circuits connected thereto, the line circuits being divided into a plurality of groups of the same size and in accordance with the directory numbers of the lines connected thereto, high speed scanning equipment provided in common to said plurality of line circuits and arranged to scan simultaneously in all the groups line circuits connected to lines having the same tens and units digits to detect a calling condition, means responsive to said scanning equipment encountering a line circuit in a calling condition in at least one of said groups of line circuits for terminating the scanning operation and means effective in the event that a line circuit in more than one of said groups of line circuits is encountered in a calling condition for singularising one of said calling line circuits.

3. Apparatus as claimed in claim 2 wherein each group of subscribers' line circuits is arranged on a two coordinate basis and the scanning equipment is arranged to scan simultaneously corresponding line circuits in all said groups of line circuits by the provision of means for applying a first potential to the line circuits in corresponding columns of all the two-coordinate groups and means for applying a second potential to the line circuits in corresponding rows of all the two-coordinate groups.

4. Apparatus as claimed in claim 2 and comprising in addition switching arrangements, control equipment provided in common to said switching arrangements to control the setting up of connections from subscribers' line circuits over said switching arrangements, the subscribers' line circuits being terminated on said switching arrangements in an order which is different from the order in which said scanning apparatus scans said line circuits, means responsive to the singularisation of a line circuit for providing an indication of the termination of said singularised line circuit to said common control equipment and means in said common control equipment for responding to said indication and for setting the switching arrangements on to the indicated termination.

5. Apparatus as claimed in claim 2 wherein said last-mentioned means comprise a hunting circuit having a plurality of stages each of which is individual to one group of line circuits and marking means are provided in the scanning equipment individual to each group of line circuits which in the event that a line circuit is encountered in a calling condition in more than one group of line circuits are effective in extending markings to the stages of the hunting circuit corresponding to the groups of line circuits in which a line circuit has been encountered in a calling condition.

6. Apparatus as claimed in claim 5 and comprising in addition control means common to all said groups of line circuits and means in said control means responsive to the operation of said marking means for preventing further operation of said scanning equipment and for initiating the operation of said hunting circuit.

7. In an electrical signalling system, apparatus comprising a plurality of circuits divided into equal size groups, each group being arranged on a two-coordinate basis, means for applying a first potential to the circuits in corresponding columns of all the coordinate arrangements and means for applying a second potential to the circuits in corresponding rows of all the coordinate arrangements whereby corresponding circuits in all the coordinate arrangements are scanned simultaneously.

8. In a telephone exchange, apparatus comprising a plurality of lines, a plurality of line circuits connected thereto, the line circuits being divided into a plurality of groups each containing 100 line circuits in accordance with the tens and units digits of the directory numbers of the lines connected thereto, means for scanning simultaneously in all the groups line circuits connected to lines having the same tens and units digits to detect a calling condition, a hunting circuit having a plurality of stages each of which is individual to one group of line circuits, means responsive to said scanning means encountering a line circuit in different groups in a calling condition for extending a marking to the corresponding stages of the hunting circuit, for terminating the operation of said scanning means and for initiating the operation of said hunting circuit to select the first of said different groups.

9. Apparatus as claimed in claim 8 wherein said scanning means include means for applying a first potential successively to line circuits in all the groups connected to lines having different units digits and means for applying a second potential successively to line circuits in all the groups connected to lines having different tens digits whereby line circuits having the same units and tens digits in all the groups have said first and second potentials applied thereto simultaneously and the lines in each group have said first and second potentials applied thereto successively in the order of their tens and units digits.

10. In a telephone exchange, apparatus comprising a plurality of subscribers' lines, a plurality of line circuits connected thereto, the line circuits being divided into a plurality of groups of the same size and in accordance with the directory number of the lines connected thereto, high speed scanning equipment provided in common to said plurality of line circuits and arranged to scan simultaneously in all the groups line circuits connected to lines having the same tens and units digits to detect a calling condition, means responsive to said scanning equipment encountering a line circuit in a calling condition in at least one of said groups of line circuits for terminating the scanning operation with the scanning equipment in the position corresponding to the calling lines encountered, means effective in the event that a line circuit in more than one of said groups of line circuits is encountered in a calling condition for singularising one of said calling line circuits and means operative when one of said calling lines has been singularised for registering the directory number of said calling line as indicated by said scanning equipment.

References Cited in the file of this patent

UNITED STATES PATENTS

| | | |
|---|---|---|
| 2,619,548 | Lesti | Nov. 25, 1952 |
| 2,688,662 | Den Hertog et al. | Sept. 7, 1954 |